United States Patent
Xue et al.

(10) Patent No.: US 9,981,309 B2
(45) Date of Patent: May 29, 2018

(54) WHEEL MOLD SPRAYING APPARATUS

(71) Applicant: CITIC Dicastal CO.,LTD, Qinhuangdao (CN)

(72) Inventors: Bowen Xue, Qinhuangdao (CN); Lihua Liu, Qinhuangdao (CN); Jiandong Guo, Qinhuangdao (CN); Weidong Liu, Qinhuangdao (CN); Yao Zheng, Qinhuangdao (CN)

(73) Assignee: CITIC Dicastal Co., Ltd., Qinhuangdao (CN)

( * ) Notice: Subject to any disclaimer, the term of this patent is extended or adjusted under 35 U.S.C. 154(b) by 0 days. days.

(21) Appl. No.: 15/385,114

(22) Filed: Dec. 20, 2016

(65) Prior Publication Data
US 2017/0182551 A1    Jun. 29, 2017

(30) Foreign Application Priority Data
Dec. 29, 2015  (CN) .......................... 2015 1 1006536

(51) Int. Cl.
- *B05B 13/02* (2006.01)
- *B05C 13/02* (2006.01)
- *B22D 17/20* (2006.01)
- *B05C 1/02* (2006.01)
- *B05B 15/04* (2006.01)
- *B05B 13/04* (2006.01)
- *B22D 25/02* (2006.01)

(52) U.S. Cl.
CPC ...... *B22D 17/2007* (2013.01); *B05B 13/0221* (2013.01); *B05B 13/0242* (2013.01); *B05B 13/0421* (2013.01); *B05B 15/0487* (2013.01); *B05C 1/027* (2013.01); *B05C 13/02* (2013.01); *B22D 25/02* (2013.01); *B60B 2310/202* (2013.01)

(58) Field of Classification Search
None
See application file for complete search history.

(56) References Cited

U.S. PATENT DOCUMENTS

| | | | | |
|---|---|---|---|---|
| 2,426,391 A | * | 8/1947 | Emerson | B05B 13/02 118/301 |
| 2,930,345 A | * | 3/1960 | Jacobsen | B05B 13/0242 118/315 |
| 4,723,563 A | * | 2/1988 | Kane | B08B 3/022 118/320 |

(Continued)

FOREIGN PATENT DOCUMENTS

CN  105397057 A  *  3/2016

*Primary Examiner* — Binu Thomas
(74) *Attorney, Agent, or Firm* — Calfee, Halter & Griswold LLP

(57) ABSTRACT

The present invention discloses a wheel mold spraying device, which is composed of a frame, a servo motor, a servo electric cylinder, a hollow shaft, a nozzle and the like. Four side molds of a wheel are respectively placed on four slide plates; hand wheels are rotated to adjust the slide plates to proper positions through lead screws and guide rails; the servo motor drives the rotation of the hollow shaft and the nozzle through belt wheels and a synchronous belt, and the nozzle is automatically opened; and through guide posts, the servo electric cylinder lifts the nozzle to the top end while rotating, in which case the process of spraying for the four side molds can be completed.

1 Claim, 2 Drawing Sheets

(56) References Cited

U.S. PATENT DOCUMENTS 5,876,501 A * 3/1999 Doan ................... B05C 1/027
                                                    118/244
2015/0273493 A1* 10/2015 Xue ................... B05C 13/02
                                                    239/224

* cited by examiner

WHEEL MOLD SPRAYING APPARATUS

CROSS-REFERENCE TO RELATED APPLICATIONS

This application claims priority to Chinese Patent Application No. 201511006536.5, filed on Dec. 29, 2015, which is hereby incorporated by reference in its entirety.

TECHNICAL FIELD

The present invention relates to an automatic spraying device, and in particular to an automatic wheel mold spraying device.

BACKGROUND ART

In order to ensure heat preservation of aluminum alloy wheel molds during a die casting process and successful removal of die castings from a mold, the mold typically needs to be uniformly sprayed with a layer of paint on inner walls thereof before being heated and put on the machine. At present, molds are manually sprayed using a handheld spray gun in all the wheel manufacturers. Use of this spraying mode not only makes it very difficult to attain a uniform and consistent spraying thickness, but also causes tremendous damages to human body due to operating environments. This device can adjust different spraying parameters according to different wheel types and is thus high in degree of automation.

SUMMARY OF THE INVENTION

It is an object of the present invention to provide a wheel mold spraying device that enables the function of automatic spraying for wheel side molds.

To achieve the abovementioned object, the technical solution of the present invention is as follows: a wheel mold spraying device is composed of a frame, a servo electric cylinder, guide posts, guide sleeves, a bottom plate, a lifting plate, a servo motor, a connecting frame, a small belt wheel, a synchronous belt, a rotating joint, a large belt wheel, a transition flange, a bearing block, a hollow shaft, hand wheels, lead screws, guide rails, slide plates, a spray gun, a connecting rod, a swivel head and nuts. Four guide sleeves are mounted on the bottom plate, four guide posts mated with the guide sleeves are mounted below the lifting plate. The servo electric cylinder is fixed below the bottom plate, and an output end of the servo electric cylinder is hinged with the lower side of the lifting plate. The servo motor with the small belt wheel mounted on the output end thereof is fixed below the connecting frame. The connecting frame is mounted at the left side of the lifting plate. The bearing block is fixed above the lifting plate through the transition flange. The hollow shaft with the rotating joint and the large belt wheel fixed on the lower end thereof is fixed within the bearing block through a bearing. The small belt wheel and the large belt wheel are connected with each other through the synchronous belt. The connecting rod with the spray gun fixed thereon is mounted on the top end of the hollow shaft through the swivel head. The slide plate with the nut fixed therebelow is fixed, through the guide rail, onto a platform above the frame. The lead screw is mated with the nut and the hand wheel is fixed at the tail end of the lead screw.

When in actual use, four side molds of a wheel are respectively placed on four slide plates, and hand wheels are rotated to adjust the slide plates to proper positions through lead screws and guide rails. The servo motor drives the rotation of the hollow shaft and the spray gun through belt wheels and a synchronous belt, and the spray gun is automatically opened. Through guide posts, the servo electric cylinder lifts the spray gun to the top end while rotating, in which case the process of spraying for the four side molds can be completed.

The wheel mold spraying device of the present invention can realize the function of automatic spraying for side molds of a wheel when in use, has a uniform and consistent spraying effect, can adjust different spraying parameters according to different wheel types, relieve the labor intensity of workers and improve their operating environments, and also has such characteristics as simple structure, great convenience in use and advanced technologies.

Figure 1:
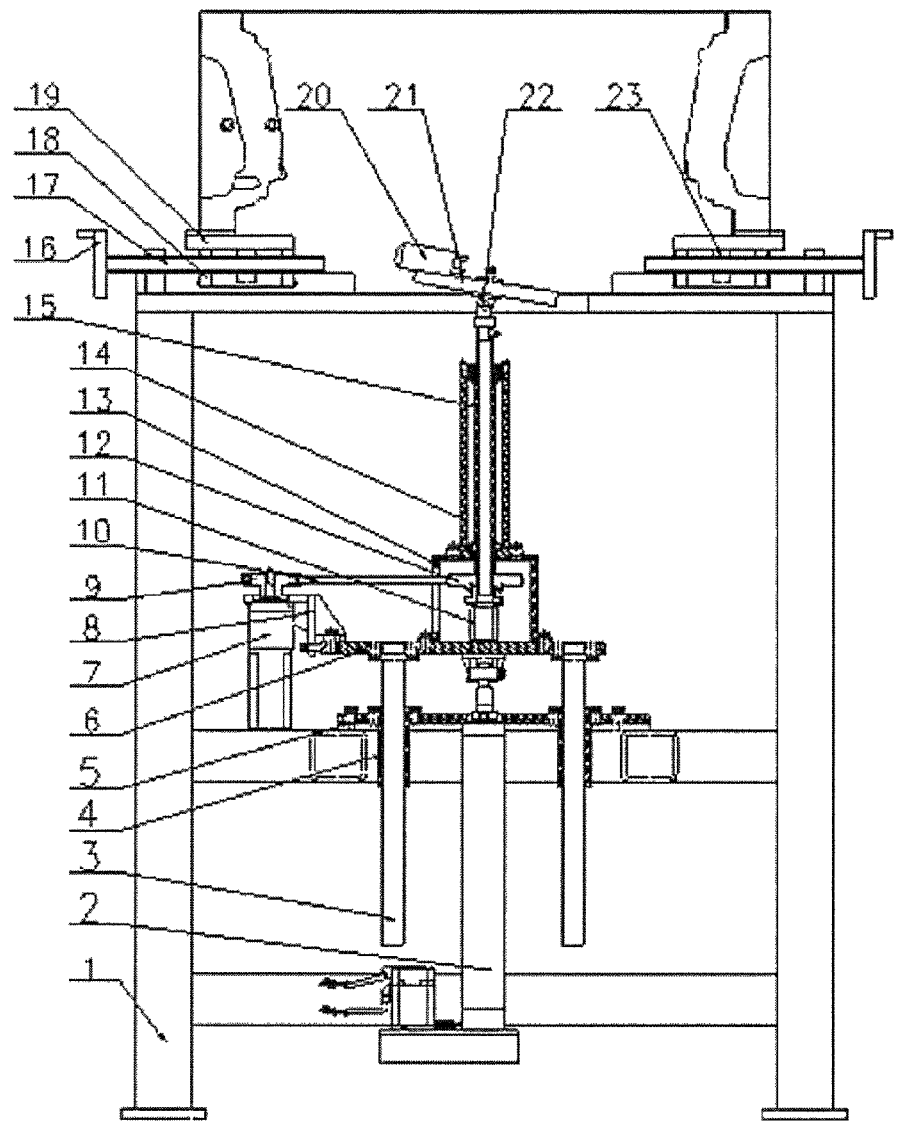
FIG. 1 is a front view of a wheel mold spraying device of the present invention.
Figure 2:
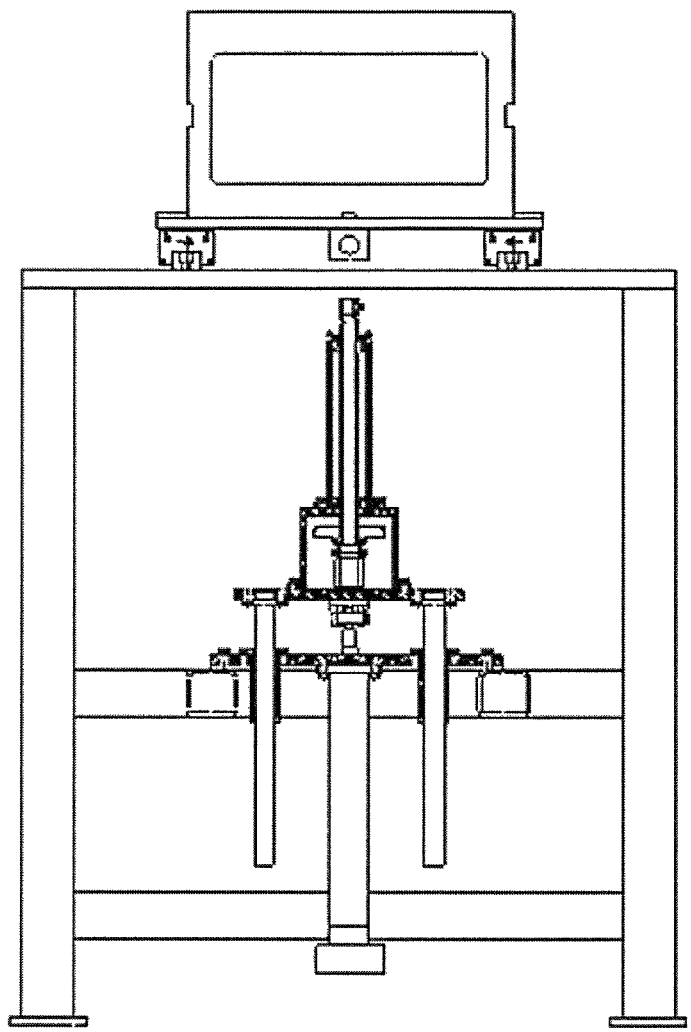
FIG. 2 is a left view of a wheel mold spraying device of the present invention.

In the drawings, 1—frame, 2—servo electric cylinder, 3—guide post, 4—guide sleeve, 5—bottom plate, 6—lifting plate, 7—servo motor, 8—connecting frame, 9—small belt wheel, 10—synchronous belt, 11—rotating joint, 12—large belt wheel, 13—transition flange, 14—bearing block, 15—hollow shaft, 16—hand wheel, 17—lead screw, 18—guide rail, 19—slide plate, 20—spray gun, 21—connecting rod, 22—swivel head, 23—nut.

DETAILED DESCRIPTION OF THE INVENTION

The details and working conditions of the specific device set forth in accordance with the present invention will be described below with reference to the accompanying drawings.

The device is composed of a frame 1, a servo electric cylinder 2, guide posts 3, guide sleeves 4, a bottom plate 5, a lifting plate 6, a servo motor 7, a connecting frame 8, a small belt wheel 9, a synchronous belt 10, a rotating joint 11, a large belt wheel 12, a transition flange 13, a bearing block 14, a hollow shaft 15, hand wheels 16, lead screws 17, guide rails 18, slide plates 19, a spray gun 20, a connecting rod 21, a swivel head 22 and nuts 23. Four guide sleeves 4 are mounted on the bottom plate 5, four guide posts 3 mated with the guide sleeves 4 are mounted below the lifting plate 6. The servo electric cylinder 2 is fixed below the bottom plate 5, and an output end of the servo electric cylinder is hinged with the lower side of the lifting plate 6. The servo motor 7 with the small belt wheel 9 mounted on the output end thereof is fixed below the connecting frame 8. The connecting frame 8 is mounted at the left side of the lifting plate 6. The bearing block 14 is fixed above the lifting plate 6 through the transition flange 13. The hollow shaft 15 with the rotating joint 11 and the large belt wheel 12 fixed on the lower end thereof is fixed within the bearing block 14 through a bearing. The small belt wheel 9 and the large belt wheel 12 are connected with each other through the synchronous belt 10. The connecting rod 21 with the spray gun 20 fixed thereon is mounted on the top end of the hollow shaft 15 through the swivel head 22. The slide plate 19 with the nut 23 fixed therebelow is fixed, through the guide rail 18, onto a platform above the frame 1. The lead screw 17 is mated with the nut 23 and the hand wheel 16 is fixed at the tail end of the lead screw 17.

During a working process of this device, four side molds of a wheel are respectively placed on four slide plates 19, and hand wheels 16 are rotated to adjust the slide plates 19 to proper positions through lead screws 17 and guide rails 18. The servo motor 7 drives the rotation of the hollow shaft 15 and the spray gun 20 through belt wheels and a synchronous belt 10, and the spray gun 20 is automatically opened. Through guide posts 3, the servo electric cylinder 2 lifts the spray gun 20 to the top end while rotating, in which case the process of spraying for the four side molds can be completed.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A wheel mold spraying device composed of a frame, a servo electric cylinder, guide posts, guide sleeves, a bottom plate, a lifting plate, a servo motor, a connecting frame, a small belt wheel, a synchronous belt, a rotating joint, a large belt wheel, a transition flange, a bearing block, a hollow shaft, hand wheels, lead screws, guide rails, slide plates, a spray gun, a connecting rod, a swivel head and nuts, characterized in that four guide sleeves are mounted on the bottom plate, four guide posts mated with the four guide sleeves are mounted below the lifting plate; the servo electric cylinder is fixed below the bottom plate, and an output end of the servo electric cylinder is hinged with the lower side of the lifting plate; the servo motor with the small belt wheel mounted on the output end thereof is fixed below the connecting frame; the connecting frame is mounted at the left side of the lifting plate; the bearing block is fixed above the lifting plate through the transition flange; the hollow shaft with the rotating joint and the large belt wheel fixed on the lower end thereof is fixed within the bearing block through a bearing; the small belt wheel and the large belt wheel are connected with each other through the synchronous belt; the connecting rod with the spray gun fixed thereon is mounted on the top end of the hollow shaft through the swivel head; each of the slide plates with the nut fixed therebelow is fixed, through one of the guide rails, onto a platform above the frame; and one of the lead screws is mated with one of the nuts and one of the hand wheels is fixed at the tail end of the lead screw.

* * * * *